US005349345A

United States Patent [19]

Vanderschel

[11] Patent Number: 5,349,345

[45] Date of Patent: Sep. 20, 1994

[54] ELECTRONIC LOCK

[75] Inventor: David J. Vanderschel, Austin, Tex.

[73] Assignee: Vindicator Corporation, Austin, Tex.

[21] Appl. No.: 906,795

[22] Filed: Jun. 30, 1992

[51] Int. Cl.$^5$ .................... G06F 7/04

[52] U.S. Cl. .................... 340/825.31; 340/825.22

[58] Field of Search .................... 340/825.22, 825.31, 340/825.34, 825.57

[56] References Cited

U.S. PATENT DOCUMENTS

| | | | |
|---|---|---|---|
| 4,717,816 | 1/1988 | Raymond et al. | 340/825.31 |
| 4,947,163 | 8/1990 | Henderson et al. | 340/825.31 |

*Primary Examiner*—Donald J. Yusko

*Assistant Examiner*—Michael Horabik

*Attorney, Agent, or Firm*—Vinson & Elkins

[57] ABSTRACT

An electronic lock system includes a key having a memory for storing a first parameter defined by a plurality of fields and a second parameter indicative of a number of the fields. A lock has a receptacle for reading the first and second parameters from the key's memory and compare circuitry for comparing respective fields of the first parameter with a third parameter stored in the lock, with the number of fields compared based on the second parameter. Access to the lock is provided responsive to the compare circuitry, such that a single key may access a predetermined set of locks. The electronic lock is capable of performing a plurality of functions. Control is provided such that permission to access the functions is configurable for each key.

9 Claims, 2 Drawing Sheets

FIG. 1
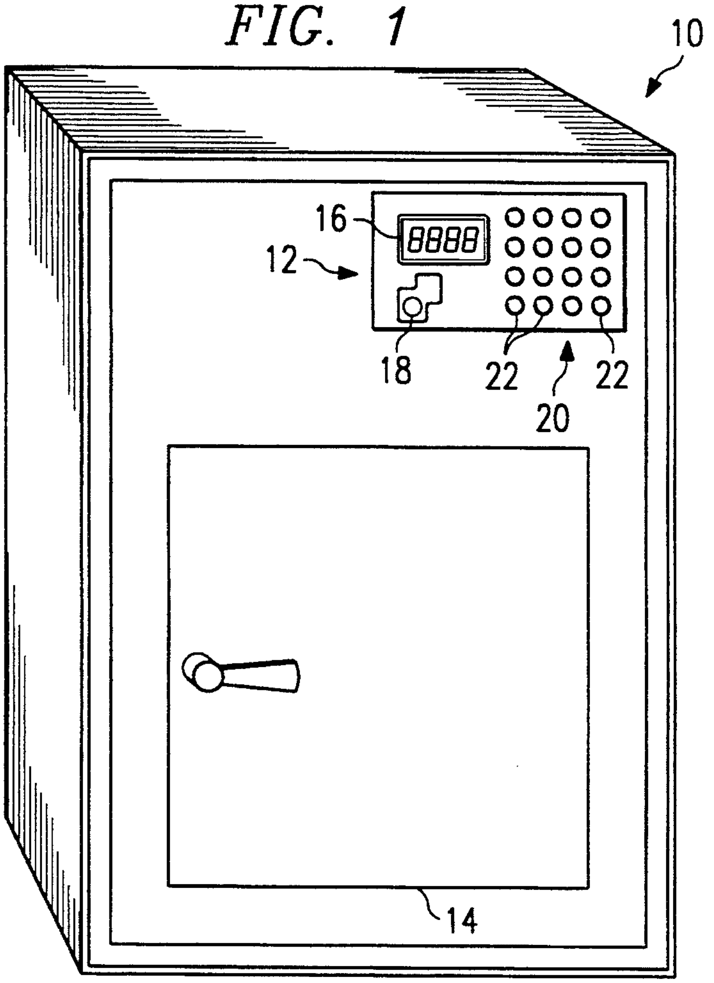
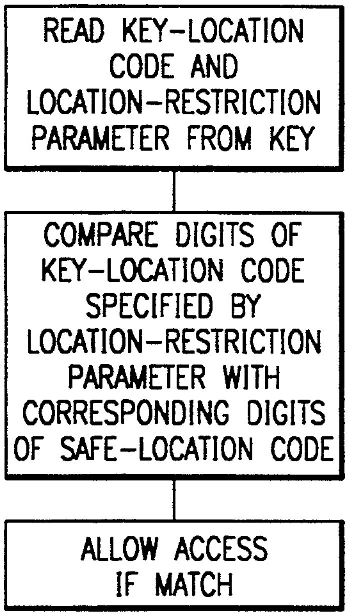
FIG. 5
FIG. 2
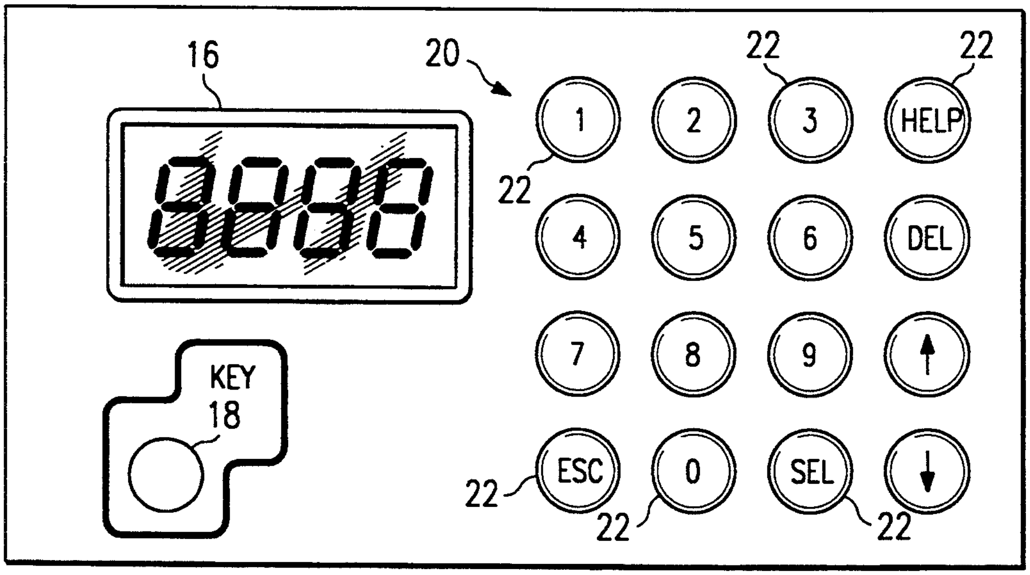

ELECTRONIC LOCK

TECHNICAL FIELD OF THE INVENTION

This invention relates in general to electromechanical devices, and more particularly to an electronic lock.

BACKGROUND OF THE INVENTION

For several centuries, mechanical locks provided the only means of securing a safe. While effective, mechanical locks suffer from many limitations. First, most mechanical locks, either key or combination, may be opened using tools available in the locksmith trade. Second, operation of the mechanical devices is extremely unsophisticated, their only function is to engage or disengage a bolt.

Over the last decade, electronic locks have become available. In the electronic lock, a bolt is engaged or disengaged typically in response to a number entered by the user. Electronic locks provide the advantage of enhanced functions through the use of intelligent processing.

However, present day electronic locks are still limited in performance. Significantly, present day electronic locks are limited in their capabilities of allowing or denying access to the secured area, particularly in situations where multiple safes are involved. Further, once access is allowed, present-day electronic locks do not provide adequate security with regard to the features which may be controlled by a user.

Therefore, a need has arisen in the industry for an electronic lock which provides maximum security with regard to access and operation while maintaining ease of use.

SUMMARY OF THE INVENTION

In accordance with the present invention, an electronic lock is provided which overcomes substantial disadvantages associated with prior art.

In the first aspect of the present invention, an electronic lock system includes a key having a memory for storing a first parameter comprising a plurality of fields and a second parameter indicative of a number of the fields. A lock comprises a receptacle for reading the first and second parameters from the key's memory and compare circuitry for comparing respective fields of the first parameter with a third parameter stored in the lock, with the number of fields compared based on the second parameter. Access to the lock is provided responsive to the compare circuitry, such that a single key may access a predetermined set of locks.

In a second aspect of the present invention, an electronic lock system comprises a lock including processing circuitry for performing a plurality of functions and an electronic key having a memory for storing key parameters, one of the key parameters being a control word having a plurality of fields corresponding to respective functions, each field indicative of whether the key is configured to access the respective function. A second control word has fields corresponding to the fields of the first control word, each field of the second control word indicative of whether the key's access to the respective function can be modified.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a perspective view of a safe using the electronic lock of the present invention;

FIG. 2 illustrates the control panel of the electronic lock;

FIG. 5 illustrates a method of allowing access to a lock.

DETAILED DESCRIPTION OF THE INVENTION

Figure 3:
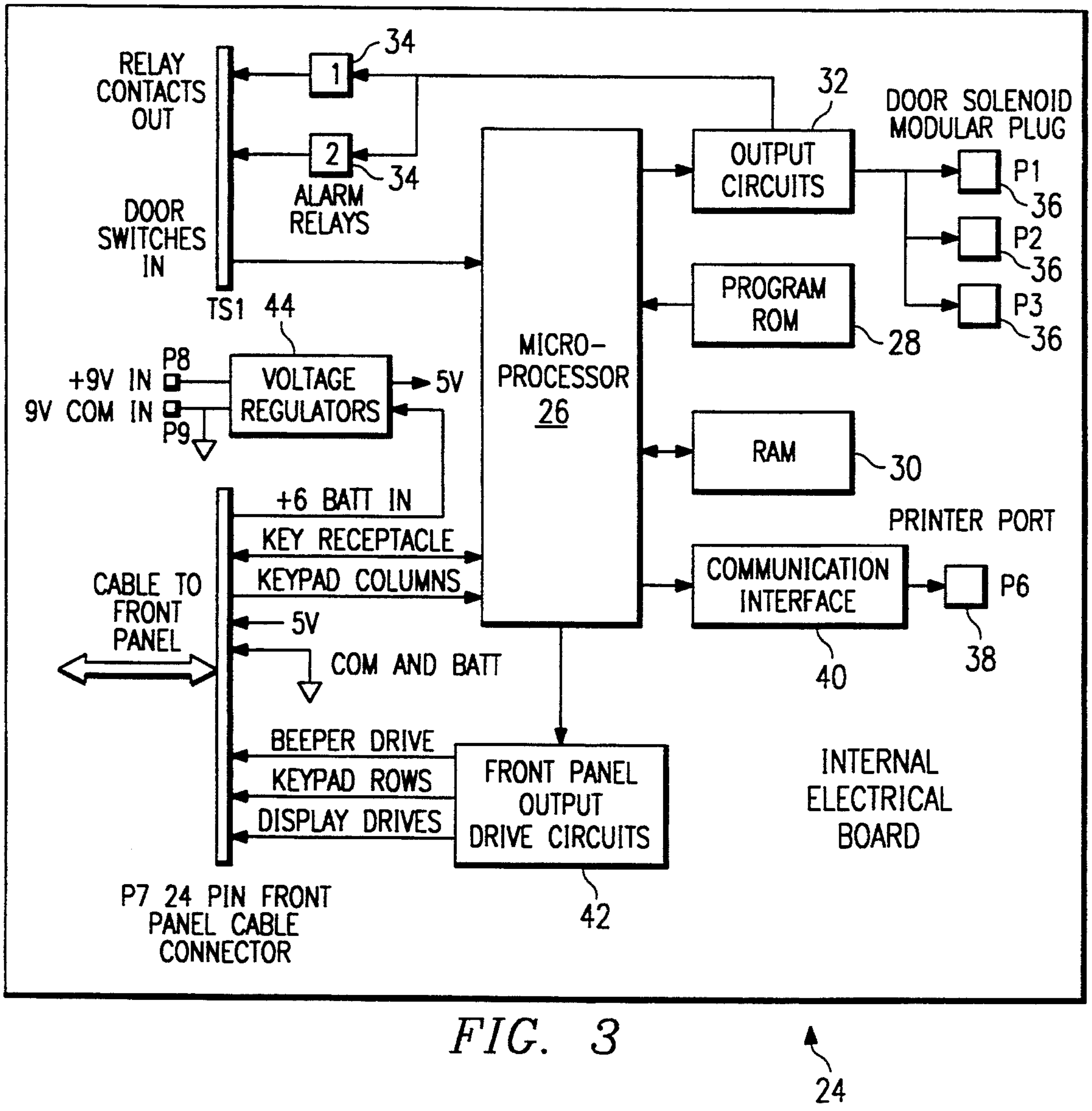
FIG. 3 illustrates a block diagram of the electronic lock.

The preferred embodiment of the present invention and its advantages are best understood by referring to FIGS. 1–4 of the drawings, like numerals being used for like and corresponding parts of the various drawings.

FIG. 1 illustrates a perspective view of a safe 10 employing an electronic lock 12. The safe may have a plurality of doors, including an outer door, shown as door 14, and multiple inner doors (not shown). The electronic lock includes a display 16, a key port 18 and a keypad 20 comprising a plurality of keys 22.

In the preferred embodiment, the display 16 is a LCD display having at least four rows of sixteen characters. While technologies other than LCDs can be used, the LCD is preferred because of its low power consumption. Also in the preferred embodiment, the key receptacle 18 is configured to electrically connect with a DS1992 touch memory (or equivalent) available from Dallas Semiconductor, Inc. of Dallas, Tex. The key receptacle 18 provides a means for reading and writing to an electronic key (the DS1992) incorporating a memory. Use of the electronic key is discussed in greater detail hereinbelow.

FIG. 2 illustrates a detailed front view of the control panel of the electronic lock 12. As can be seen, the electronic key receptacle 18 is circular for receiving the key, which has the approximate diameter of a dime. The keypad 20 includes sixteen keys: the numbers 0–9, an Escape (ESC) key, a Select (SEL) key, a Help key, a Delete key, and Up/Down cursor keys.

The key receptacle 18 receives the electronic key and is operable to communicate data to and from the key. The keypad 20 allows the user to input data and commands to the electronic lock 12. The cursor control key allows the user to highlight commands on the display 16. Action may be taken on a selected command by pressing the Select key. The Help key diverts program control to a help routine which provides instructions to the user. The Escape key allows the user to exit a menu level.

FIG. 3 illustrates a block diagram of the logic which operates the lock 12. The logic 24 comprises a microprocessor 26 coupled to a program ROM memory 28 and a RAM memory 30. The microprocessor 26 is also coupled to output circuits 32 which communicate with alarm relays 34 and door solenoid jacks 36. The microprocessor communicates with a printer jack 38 via a communication interface 40. Front panel output drive circuits 42 are coupled to the microprocessor 26 to drive a beeper (not shown), the display 16 and keypad rows. Keypad column signals are input to the microprocessor. The key receptacle 18 also communicates directly with the microprocessor 26. Sensors which indicate the state of the doors of the safe 10 are input to the microprocessor 26. A voltage regulator 44 receives nine volts and output five volts to the microprocessor and to the front panel. An option six-volt battery may also be input to the voltage regulator to provide backup power.

In the preferred embodiment, the microprocessor comprises a 80C51, which is a low-power microprocessor, available from a number of sources such as Intel Corporation which includes a 4K internal memory. The internal memory of the microprocessor 26 may be restricted from external viewing; hence, sensitive program code, such as encryption code, is provided within the microprocessor's internal address space. The remaining code is provided on the program ROM 28. The RAM 30 is used to store a "key database" (TABLE 2), safe parameters (TABLE 3) and a historical file of accesses and attempted accesses.

The printer jack 38 is used for interfacing with a printer to output reports on the lock's databases and the history file. The door solenoid jacks 36 provides signals to one or more doors of the safe to permit the unlocking of those doors. The alarm relays 34 are used to interface with an existing alarm system.

Figure 4A:
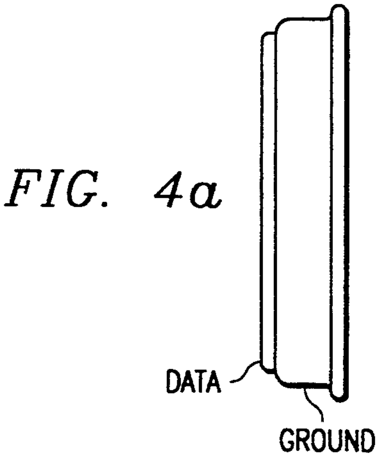
FIGS. 4*a–b* illustrate side and front views of the preferred embodiment of the key used in connection with the electronic lock.
Figure 4B:
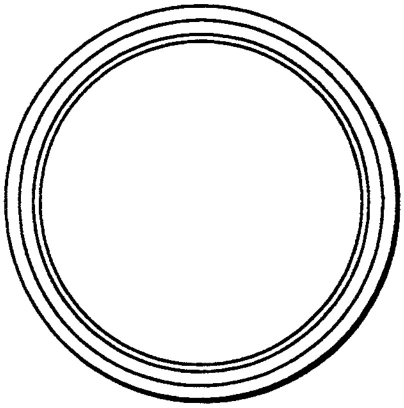

Importantly, the logic 24 reads data from and writes data to a key. FIGS. 4a–b illustrate top and side views of the key 46 used in the illustrated embodiment. The key comprises a DS1992 touch memory sold by Dallas Semiconductor, Inc. of Dallas, Tex. This device provides a 1024-bit read/write nonvolatile memory divided into four 32-byte pages. Data may be transferred to and from the key using a single data lead and ground return. Each of the devices has a factory lasered 48-bit serial number which can be electronically read in order to provide absolute traceability of each key.

OVERALL OPERATION OF THE LOCK

In operation, in order to access the safe, or any of the electronic lock's features, the user must have a key 46 which has been enrolled in the safe's key database. A user can be enrolled only by another user with authority to enroll the new key. This authority is discussed in greater detail hereinbelow.

Once a user is enrolled, the user may access certain features. The features which may be accessed by a particular user are controlled by the parameters stored in the user's key 46 and in the lock 12.

Once a user's key is enrolled, the user may access the lock's functions by placing the key 46 in the key receptacle 18 of the lock 12. In response to sensing the key 46, the lock 12 will prompt the user to enter a personal identification number (PIN) via display 16. The user enters his PIN using keypad 20. If the PIN is successfully entered, the user is "logged in" and the lock's functions are available to the user in accordance with the user's permissions.

The methodology through which the features of the lock are accessed are controlled by "Permission" parameters stored in the user's key and the lock. These Permission parameters will enable or prevent the user from unlocking the safe's doors, printing information stored in the lock, adjusting time and date parameters, configuring parameters associated with the inner and outer doors and the control panels, and enabling or preventing others from accessing the lock.

A detailed list of Permissions is provided in connection with Table 4.

In the preferred embodiment, the electronic lock 12 provides features useful to companies having safes in multiple locations where personnel may be required to access more than one safe. It is assumed that some of the features may be programmed by the safe's vendor (i.e., the manufacturer or an OEM). For purposes of the document, the company using the safe will be referred to as the "customer" or "company".

KEY PARAMETERS

A list of important parameters stored in each key is given in connection with TABLE 1 hereinbelow.

TABLE 1

KEY PARAMETERS

| | Parameter |
|---|---|
| USAGE | Mfr.-Usage-Code |
| | Client-Usage-Code |
| | Encryption-Method |
| ENCRYPTION | Seeds |
| STATIC | Customer-Company-Code |
| | Customer-Key-Series |
| | Enrollment-Level |
| | Maximum-Key-Administration |
| | Location-Restriction |
| | Key-Number |
| | Key-Type |
| | Key-Level |
| | Permission-Defaults |
| | Permission-Modifiability |
| VARIABLE | Location-Code |
| | PIN |
| | PIN-Date |
| | Employee-ID |
| | User-Name |

As listed in TABLE 1, each parameter is associated with a memory page. For purposes of security, the data in each page, except for Page 1, is encrypted. The Seed data used for encryption is stored in Page 2. Page 3 of the key's memory contains data which is static, i.e, data which will not be changed during normal use of the key. Page 4 contains variable data which may change during use of the key.

The Manufacturer-Use-Code is available to the lock manufacturer to indicate how a key is to be used. This code may be used, for example, if the manufacturer produces electronic locks used for purposes other than safes. The Client-Usage-Code is for use by an OEM to indicate how a key is to be used. The Encryption-Type parameter indicates how the remaining data in the key is encrypted. The Encryption-Type parameter is not itself encrypted. This allows several different encryption schemes to be used, thereby increasing the security of the system.

The static parameters of Page 3 of the key's memory are typically programmed by the vendor, although it would be possible for the customer to perform the programming. The Customer-Company-Code parameter is recorded in a key before it is delivered to a customer. The purpose of the Customer-Company-Code parameter is to assure that keys sold to one customer cannot be enrolled in the safes of other companies. The Customer-Company-Code is four BCD digits, in the preferred embodiment.

To allow for the possibility that a customer might mismanage its keys, the Customer-Key-Series parameter is provided such that a customer may invalidate all keys of a previous Customer-Key-Series by changing the Key-Series associated with a lock. The Customer-Key-Series is a two-digit decimal number.

The Key-Type parameter allows a customer to define different types of keys, distinguished by the exact set of permissions and other controls recorded in the key. The Key-Type parameter is identified by a two-digit decimal number which is recorded in the key. Certain operations may be based on the Key-Type parameter.

Each key is identified on the outside by a six-digit Key-Number for keeping track of individual keys. A key's Key-Number is also stored in the key's memory.

The Employee-ID parameter specifies a number up to nine digits long which uniquely identifies a particular employee, for example, by social security number. The User-Name parameter specifies an alphabetic string of up to ten characters for each user. It is expected that, in most cases, only the initials or first name and possibly the last initial would be entered. The User-Name parameter is included in reports to allow easier recognition of records associated with an particular user. This should be contrasted with the Employee-ID parameter which provides unique identification.

The PIN parameter specifies the user's PIN. Since the PIN parameter is encrypted, it is safe from unauthorized inspection. The PIN-Date parameter specifies the date on which a PIN was last changed. This allows the lock 12 to require users to change PINs periodically for security reasons.

The remaining key parameters of TABLE 1 will be discussed hereinbelow in connection with their functional operation.

Location Code

Each lock 12 has an associated Safe-Location-Code parameter (see TABLE 3) which is a number up to ten digits long and specifies the place where the safe is installed. These numbers are chosen by the customer and must be unique for each safe. All Safe-Location-Codes for the same customer should have the same number of digits. To avoid ambiguity, zero should never be used as the first digit of the Safe-Location-Code.

The first time a key is enrolled, the Safe-Location-Code parameter is also recorded in the key as the Key-Location-Code. The purpose of this procedure is to prevent the same key from being enrolled in certain other safes for the same company.

Each key also has a Location-Restriction parameter, which is provided prior to initial enrollment. In general, the Location-Restriction parameter specifies the number of digits that must match between the Safe-Location-Code and the Key-Location-Code in order for a key that is already enrolled in another location to be enrollable. For example, if a company uses ten-digit Safe-Location-Codes, a Location-Restriction parameter of ten would allow the key to be enrolled only in the safe in which it was originally enrolled. However, some keys may have their Location-Restriction parameter set to a number of digits less than the total number of digits in the Safe-Location-Code. For these keys, it is possible to enroll the same key in any safe whose Safe-Location-Code agrees with the Key-Location-Code through as many digits as are specified by the Location-Restriction parameter (starting from the highest-order digit). For example, if the Key-Location-Code is "123456" and its Location-Restriction parameter set to "4", the key may be enrolled in any safe whose Location-Code begins with the digits "1234". Hence, the key could be enrolled in a safe whose Location-Code was "123498" but not a safe with a Location-Code "124456".

By dividing the ten possible digits of the Safe-Location-Code into fields, a customer can use the fields to correspond to identifiers for the nodes in a hierarchical organization by which the company operates. For example, a seven-digit Location-Code could use two digits for region identification, two digits for area identification and three digits for individual stores within an area. A Location-Restriction of four digits would allow a key to be enrolled in any store of the same area, but not outside the area. A Location-Restriction of two digits would allow the key to be enrolled in any store in any area of a single region. This function is shown in FIG. 5.

Permission Control

As previously described, not all capabilities of the lock 12 are available to all users. Sets of "Permissions" are associated with each key. Control of Permissions is the main method used to configure the locks for different customer requirements. Since a user may access a function only through the keypad 20 and display 16, the lock does not even offer the option of performing a function unless the user is so authorized. A list of Permissions is shown in connection with TABLE 4, and described in greater detail hereinbelow.

Permissions are controlled both by the keys and by the locks. The Permission control information included in the key includes the Permission-Defaults parameter and the Permission-Modifiability parameter. The Permission-Defaults parameter and Permission-Modifiability parameter each comprise a bit for each possible Permission. The Permission-Defaults specify whether, upon enrollment, the user is authorized for a given Permission. The bits of the Permission-Modifiability parameter indicate whether a given Permission may be changed on any given safe. Each safe maintains an Active-Permissions parameter for each key enrolled in its key database. Upon enrollment, the Active-Permissions for a key will be set to the key's Permission-Defaults parameter. For each Permission, the associated bit of the Active-Permissions parameter may be changed only if the corresponding bit of the Permission-Modifiability parameter is set to allow modifications. A Permission for which the Permission-Modifiability is set to "yes" is said to be a "modifiable" Permission for the key and a Permission for which the associated bit of the Permission-Modifiability parameter is set to "no" is said to be a "fixed" Permission for the key.

Assuming that a bit set to "0" indicates a "no" and a bit set to "1" indicates a "yes" if bit "0" of the Permission-Defaults parameter is set to "0" and bit "0" of the Permission-Modifiability parameter is set to "1", then, upon enrollment bit "0" of the Active-Permissions parameter in the key database of the safe will be set to "0". However, since the corresponding Permission-Modifiability bit is set to "1" that Permission (shown in Table 4 as the Permission to open the outer door of the safe) may be changed.

It should be noted, that the Permission-Defaults and the Permission-Modifiability parameters of the key are static. When a Permission is modified, it is only modified for the activity Permission parameter in the safe's key database, and thus, the Permission-Defaults for the key itself remains unchanged.

Key-Administration-Authority

Each enrolled key has an associated Key-Administration-Authority stored in the lock's key database. This is a number in the range from zero to one hundred, which is held in the key database but which is not included directly in the key's data. The Key-Administration-Authority parameter affects the ability of the key holder to enroll and modify the Permissions for other keys. To discuss these matters, it is convenient to be able to refer to a "Logged-In-Key" and a "Target-Key". The data associated with the Target-Key is subject to modification under the authority of the Logged-In-Key.

In particular, the Logged-In-Key may enroll or delete another key so long as the Key-Level parameter of that Target-Key does not exceed the Key-Administration-Authority of the Logged-In-Key. Furthermore, the Logged-In-Key may change a modifiable-permission parameter of a Target-Key only if the Target-Key's Key-Level parameter does not exceed the Key-Administration-Authority parameter of the Logged-In-Key. To grant a Permission, the Logged-In-Key must also already have the permission. However, a Logged-In-Key can still enroll a Target-Key that has a Permission which the Logged-In-Key does not have if the Logged-In-Key has Key-Administration-Authority over the Target-Key's Key-Level and the Target-Key's Permission-default for that Permission is "yes".

Another parameter included for each key is its Maximum-Key-Administration-Authority parameter. On enrollment, the Key-Administration-Authority associated with a key is the smaller of its Maximum-Key-Administration-Authority and its Key-Level minus one (not to go less than zero). The assumption is that, by default, a key should not have Key-Administration-Authority over keys at the same Key-Level as itself. A Logged-In-Key may be used to modify the Key-Administration-Authority of a Target-Key so long as the Key-Level of the Target-Key does not exceed the Key-Administration-Authority of the Logged-In-Key and the new Key-Administration-Authority does not exceed that of the Logged-In-Key or the Maximum-Key-Administration-Authority of the Target-Key. There is no sense in which Maximum-Key-Administration-Authority for a given key may be modified by the lock.

To allow for bootstrapping the enrollment of powerful keys when a safe is first delivered, there is a possible exception to the treatment of Key-Level on enrollment of a key. A key also has an Enrollment-Level parameter which should be the same as its Key-Level for most keys. However, there may be keys which have their Enrollment-Level set to a value less than their Key-Level. This allows enrollment of the special key by another already-enrolled key which would not ordinarily have Key-Administration-Authority over the special key.

Thus, the precise rule for enrollability is that a Logged-In-Key may enroll a Target-Key if the Key-Administration-Authority of the Logged-In-Key is at least as large as the Enrollment-Level of the Target-Key. If the Key-Administration-Authority of the Logged-In-Key is less than the Key-Level of the Target-Key, then, once the Target-Key has been enrolled, the Logged-In-Key does not have Key-Administration-Authority over the new key. Also, in cases where the Enrollment-Level of a key is less than its own Key-Level, the Key-Administration-Authority of the key on enrollment is equal to the smaller of its own Key-Level and its Maximum-Key-Administration-Authority (i.e., such keys may have Key-Administration-Authority over other keys at the same Key-Level).

KEY DATABASE

Each lock 12 maintains a set of information for each key which has been enrolled for use with that safe. This set of information is called the "Key Database" for that lock.

TABLE 2

| KEY DATABASE RECORD PARAMETERS |
|---|
| Key Parameters (see TABLE 1), except: |
| Customer Company Code |
| Customer Key Series |
| PIN Date |
| Bad-PIN-Count |
| Key-Administration-Authority |
| Active-Permissions |
| Key-Serial No. |
| Date |
| Status |

The key parameters are those parameters described in TABLE 1. Of the parameters shown in TABLE 1, the key database does not maintain the Customer-Company-Code, Customer-Key-Series or PIN-date.

The Bad-PIN-Count is a count of successive incorrect PINs entered by a user. If the Bad-PIN-Count parameter reaches "5", the key may be deleted from the key database. This deletion feature is optionally enabled.

The key-serial-no is the 48-bit number which is etched into each key by the manufacturer of the key (i.e., Dallas Semiconductor, Inc.).

The Status parameter specifies whether the status of the key is "enrolled", "deleted" or "attempted". An "attempted" status indicates that a non-enrolled key was used in an attempt to open the safe. A non-enrolled key is placed in the key database for tracking purposes.

The Key-Administration-Authority and Active-Permissions parameters are discussed hereinabove.

ENROLLMENT

The ability to enroll keys is subject to the Key-Administration-Authority bureaucracy which has already been described herein and Permissions regarding the enrollment and deletion of keys (see TABLE 4). The authority to enroll keys at a given Key-Level carries with it the corresponding authority to "disenroll" or delete keys at that level. A key may be deleted from a lock's key database without having the disenrolled key present. To prevent accidental deletion of sufficiently powerful keys, there is a Min-Max-Key-Level parameter (see TABLE 5) associated with each lock which specifies the smallest Key-Level that is tolerated for the largest Key-Level of all enrolled keys. If there is an attempt to delete a key whose Key-Level is greater than or equal to Min-Max-Key-Level and it is the last such key, the request will be refused.

In a lock, it is possible to enroll at least forty different keys. When a new key is enrolled, an available Key-Index is chosen by the lock. The actual key itself must be present for the enrollment process so that its relevant data may be captured and its Location-Code parameter may be checked or written. Unless the same key had been enrolled earlier and remains in the key database, the default state for the safe's Active-Permissions for a newly enrolled key is specified by the Permission-Defaults from the key. If the key is in the key database, but it is currently deleted, then all the old information associated with the key (including the active-permissions) is used to establish defaults for the reenrollment with one important exception: the Key-Administration-Authority for the key will still default to one less than its Key-Level (if that is less than its Maximum-Key-Administration-Authority). Even the exception does not apply if the key is still currently active (not deleted).

Starter-Key

Each safe is delivered with one key already enrolled, called the "starter key", for the safe. Based on the Key-Level policy of the customer, the starter key may be used to enroll any other types of keys that will be needed for the safe. The Key-Administration-Authority of the starter key will be at least as large as its Key-Level. There is nothing particularly special about the starter key itself, and it may be assigned to some employee (such as the store manager).

In general, it will still be necessary to invoke the enrollment procedure on the starter key in order to enter employee-specific information not available when the starter key was enrolled at the factory. A key can be used to reenroll itself if its Key-Administration-Authority is not less than its Key-Level. In such cases, modifiable Permissions for the key may be revoked by itself. It is probably inadvisable to revoke any Permissions of the starter key until at least one other key of high Key-Level has been enrolled.

Key Deletion

In order to delete a key from the key database for a lock, the key need not be present. However, if the actual key is presented for the purposes of identifying the key to be deleted and its has a Location-Restriction of "10" (the maximum), then the key will be rewritten to reflect the fact that it is no longer enrolled at any location. (The Location-Code is cleared.) This means that the same key can be reenrolled in some other safe of the same customer.

If a key was deleted from key database when the actual key was not present, then it is still possible at some later time to rewrite the key so that it becomes enrollable elsewhere. This is done by invoking the deletion procedure in the regular way and presenting the key to identify it. In this case, even though the key is no longer in the key database, the lock will recognize that it had been enrolled in the same safe and will modify the key's data.

The Location-Code of a key with a Location-Restriction less than the maximum is never rewritten, as such a key may be currently enrolled in other safes. (To reenroll such a key in a safe outside the set of locations to which it is restricted requires "remaking" the key, which is equivalent to starting over with a new key.)

Key-Exclusion

There is always the danger that even a trusted employee will become unreliable. If such an employee has a type of key that is powerful and easily enrolled in multiple safes, this constitutes a severe security risk. A feature call "key exclusion" prevents specified keys to be enrolled in any safe from which they have been excluded. This is much more powerful than mere deletion. Once a Key-Number has been excluded from a given lock, it is not only deleted but that key may never be enrolled subsequently in that lock. A Key-Number is excluded by placing the number in a list of excluded Key-Numbers maintained by the lock.

Since there may be circumstances under which Key exclusion is needed on short notice, keys with otherwise low permission levels may be required to perform the exclusion. Thus, in the preferred embodiment, Key exclusion is protected with the use of Exclusion-Codes which are pseudo-random 6-digit numbers. Each safe has a set of exclusion codes. These are printed out once, when they are selected. There is no Permission required to exclude keys; but, to exclude a Key-Number, a user needs to know one of the Exclusion-Codes. The full set (of up to forty) such numbers can be distributed to trusted employees, one of whom can provide an Exclusion-Code at such time as it is needed. If the list is lost, a new list can be made by reassigning unused Exclusion-Codes. Permission is required to assign Exclusion-Codes or to remove an exclusion (i.e., allow again the enrollment of a given Key-Number).

Type-Exclusion

It is conceivable that a customer may define a type of key and subsequently regret that there are any keys of that type out there. Thus, in addition to individual key exclusion, the lock also offers type exclusion, which will similarly prevent enrollment of any key of the specified Key-Type. The mechanisms for excluding Key-Types and Key-Numbers are identical.

Pre-Enrollment

The locks provide a feature called "Pre-Enrollment", which allows a key with adequate Key-Administration-Authority to specify in advance that a particular Target-Key may be enrolled on the safe. This feature is used when the Target-Key in question has higher Enrollment-Level and Key-Level than could be enrolled by personnel ordinarily present at the store. The purpose of this feature is to allow a key with high Key-Administration-Authority to be used to authorize the enrollment of the Target-Key at a time when the Target-Key itself is not present (e.g., the District Security Manager is involved in setting up the safe and wants to authorize the enrollment of the Area Manager, even though the Area Manager is not currently present). The capability is subject to Permission.

In order to pre-enroll a key, its Key-Number must be known. When a key is pre-enrolled, a record for its is assigned in the key-database. The only relevant information that must be captured at the time of Pre-Enrollment is the Key-Number of the Target-Key and the Key-Administration-Authority of the Logged-In-Key. (The name and/or Employee-ID of the key holder may optionally be entered at this time.) When the holder of the Target-Key arrives, his key must be enrolled using the Logged-In-Key of a (fully) enrolled key holder. However, the lock will recognize that the Target-Key has been pre-enrolled and the Logged-In-Key will effectively take on the Key-Administration-Authority of the key that did the original Pre-Enrollment.

SAFE PARAMETERS

The parameters associated with a safe are set forth in TABLE 3.

TABLE 3

| SAFE PARAMETERS |
|---|
| Customer-Company-Code |
| Customer-Key-Series |

TABLE 3-continued

| SAFE PARAMETERS |
|---|
| Number-of-Inner-Doors |
| Inner-Door-Sensor-Presence |
| Time-Lock-Override-Enable |
| Duress-PIN-Mode |
| PIN-Life |
| PIN-Reject-Enable |
| Deferred-Widening-Enable |
| Lost-Key-Override-Enable |
| Idling-Display-Text |
| Min-Max-Key-Level |
| Communications-Handshake |
| Communications-BAUD-Rate |
| Daylight-Savings-State |
| Safe-Location-Code |
| Delay-Interval |
| Access-Interval |
| Open-Warning-Interval |
| Openable-Days |
| Openable-Intervals |
| One-Time-Combinations |

The Delay-Interval, Access-Interval and Open-Warning-Interval parameters are specified for each door of the safe and the Openable-Days and Openable-Intervals parameters are specified for each lock. These parameters are used to specify the conditions under which the safe may be opened.

The safe parameters are discussed in connection with their function hereinbelow.

Display

When the lock is in idling-mode, the LCD display 16 shows current time and date and some appropriate "logo". The parameter Idling-Display-Text, is a text string for use on the display in idling-mode. The string can be modified by the holder of a key with appropriate Permission (to "Set Operating Parameters").

Clock

Time in the lock is based on 24-hour time (no AM or PM). The ability to set the time or date is subject to Permission. The Daylight-Savings-State parameter indicates whether the current time display is on Standard Time or Daylight Savings Time. There is a separate Permission to change it. The Permission to change Daylight-Savings-State is not as powerful as that to set the time and may be granted to more keys.

TIME LOCK

Locks

The lock provides for time lock capability on each of the safe doors and on the control panel itself. Conceptually, there are three kinds of locks—the "control panel lock" the "inner door locks" and the "outer door lock". For each day of the week and for each lock, it is possible to program an Openable-Interval parameter. Normally, a lock may not be unlocked during times outside the associated Openable-Interval. The ability to set Openable-Intervals is subject to Permission. There is a separate mechanism from the time intervals themselves to specify which days of the week a lock can be unlocked at all.

The word "unlock", when applied to the control panel lock, refers to the ability of a user to log-in. When the control panel is locked, users cannot log-in. The lock will allow a user to try and will respond normally up to the point where a valid PIN is submitted. At that point, the lock will announce (via the display 16) that it is locked and proceed no further. Such events are always logged (i.e., written to a history file, described below) whether the PIN is valid or not, since it is of some interest in the history log as to whether or not the person who attempts an access out of an Openable-Interval knows the PIN which is associated with the key he is using.

Openable-Intervals

The start-time for an Openable-Interval is assumed to start during the day of the week with which the interval is associated. If the end-time (or lock-time) for an interval is numerically less than or equal to the start-time for the same interval, the end-time is assumed to occur on the following day of the week. For example, suppose that the Openable-Interval for Tuesday starts at 22:30 and ends at 1:00. Then "1:00" refers to 1:00 on Wednesday.

In the preferred embodiment, the factory defaults for Openable-Intervals have the start- and end-times for the intervals at 0:00, which allows the safe to be unlocked at any time on any day. The inner door will never unlock unless the time is in an Openable-Interval for the outer door also. Thus, if the customer wants the time lock feature to apply uniformly to both doors, it is sufficient to set up Openable-Intervals on the outer door only and leave the inner door Openable-Intervals at the default "anytime" values.

Excepting Time-Lock-Override (described below), the Lock-Release-Signal cannot be sent to a door unless the current time is an Openable-Interval for the door when the access-sequence is started. Under no circumstances can a Lock-Release-Signal be sent unless the time is in an Openable-Interval for the Control panel lock.

Deferred Widening of Today's Openable-Interval

If an attempt is made to modify an Openable-Interval for a door at a time which is not in an Openable-Interval for the same door, then certain constraints may be imposed. As long as there is no attempt to modify the next Openable-Interval to occur, there is no problem. For example, after Monday's Openable-Interval ends and before Tuesday's Openable-Interval begins, a user (with Permission) may freely modify the Openable-Interval parameters for Wednesday through Monday. Even for the next Openable-Interval (Tuesday's, in the preceding example), it is permissible to modify the Openable-Interval parameters if the new start-time is not earlier and the new end-time is not later than it was before. On the other hand, if a user attempts to widen the next Openable-Interval in either direction, then the change is not effective until the following week. The next Openable-Interval for that door will occur as previously scheduled. These considerations do not apply to the control panel lock, as nothing can be modified unless the current time is in an Openable-Interval for the control panel. The above feature is called "Deferred-Widening" and the behavior is controlled by the "Deferred-Widening-Enable" parameter.

Time-Lock-Override

When large amounts of money are being stored and armored carriers are used to pick it up, it may not be feasible to anticipate the necessary Openable-Intervals for the inner door(s). To allow for this situation, the lock provides a capability, called "Time-Lock-Override", to override the time lock with a 2-man access.

This capability is well-protected with Permissions and, in the absence of such Permissions, it implies no compromise in time lock security.

There is a Permission, called "External-Override", which may be granted to an appropriate key. There is another, called "Internal-Override", which may be granted to some other key. No key may have both Permissions. The intent is that a key be enrolled with the External-Override Permission, any relevant door opening Permissions, and no others. This key is then placed in the possession of the armored carrier. This is the "External-Key". It is also intended that keys with Internal-Override Permission are assigned only to trusted employees; thus, these are the "Internal-Keys".

If the External-Key is presented when the control panel is not locked, then the lock prompts immediately for an Internal-Key. No PIN is required for the External-Key. An Internal-Key must be presented within ten seconds of the External-Key. If there follows a successful log-in for an Internal-Key, then the lock will allow access, with no delay, to any door for which both keys have unlocking Permission.

Temporary Time Lock Cancellation

There is a mechanism to prevent the occurrence of Openable-Intervals on a one-time basis (e.g., for holidays). Any day of the week may be so marked for temporary cancellation. When time comes for that Openable-Interval to begin, the corresponding Openable-Interval does not occur, but the mark is removed so that the Openable-Interval will occur normally on that day of the week for the following week. The ability to temporarily cancel Openable-Intervals is subject to Permission.

Lost-Key-Override

To allow for cases of lost keys, there is a feature, called Lost-Key-Override which allows a log-in to be initiated without a key. This is done by entering a sequence of digits on the keypad when the lock is in idling-mode. The combination is specific to a particular key, a particular safe, and a particular date. It must be obtained from a vendor, for security reasons.

Punching in the special combination for Lost-Key-Override is equivalent to presenting the corresponding key. Nothing is echoed on the display during entry. If the combination is entered correctly, the lock will proceed to prompt for the PIN for the key as usual. Use of Lost-Key-Override makes a special entry in the history log.

The Lost-Key-Override capability must be explicitly enabled in a given safe, so customers who are concerned about the apparent security loophole can disable it. The ability to enable it is covered by a Permission.

One-Time-Combinations

Also to allow for cases of lost keys, there is another feature, called "One-Time-Combination" which allows a log-in to be initiated without a key. This is also done by entering a sequence of digits on the keypad when the lock is in idling-mode. Again, there is no acknowledgement of the activity unless the combination is entered correctly. The combination may only be used once. There is a Permission for entering One-Time-Combinations. It is not advisable for anyone regularly at the site to have this Permission. (I.e., it should be administered, with great care, from customer company headquarters.) Each safe will maintain up to ten One-Time-Combinations.

A One-Time-Combination is not specific to a particular user or date. After entry of a One-Time-Combination, a user is prompted for his Employee-ID and PIN. If the same Employee-ID is associated with more than one key, then the one with the highest Key-Level will be logged-in. If a user errs more than once attempting to use a One-Time-Combination, the One-Time-Combination is wasted.

Safe Access

To gain access, a user must log-in and select a menu item to open the desired door. If the current time is not in an Openable-Interval for the outer door, the first two lines of the display in idling-mode show "TIME LOCK: NO ACCESS!". Similarly, if the outer door is openable but the key holder has no Permission for an inner door which is currently openable, there is also an explicit indication of inaccessibility. In this case, and contrary to the usual convention of not offering forbidden options, the user will be offered the OPEN INNER DOOR option on the menu after the logs-in. However, if he selects it, the lock will respond with "no inner doors accessible!".

Delayed-access capability is implemented for both doors. Requesting the opening of a door initiates an access-sequence which may prevent the user from opening the door immediately and will insist on the user closing the door eventually. Associated with delayed-access capability, there are parameters for Delay-Interval, Access-Interval, and Open-Warning-Interval. These three parameters are referred to collectively as the "Access-Parameters" for the corresponding door. These parameters are defined independently for each door, and the ability to modify them is subject to two separate Permissions for outer and inner doors, respectively.

When an access-sequence begins, if the Delay-Interval is non-zero, a timed interval of duration equal to the Delay-Interval begins. The accrued time is displayed while the delay is in progress. When the Delay-Interval has passed, a medium beep sounds to alert the user that the safe may now be opened. As soon as the Delay-Interval ends, a countdown of duration equal to the Access-Interval begins. If the door is not opened before the end of this second interval, the access operation is terminated and the door cannot be opened without initiating another access-sequence.

The Access-Interval parameter for the outer door may be set to zero, in which case, the effective Access-Interval is the time until the end of the current Openable-Interval or fifteen minutes, whichever is greater. Zero is not permitted for the Access-Interval of an inner door.

In order to actually open the door in the case of delayed-access, a user must again present his key. The key need not be the same one as was used to initiate the access-sequence, but it must also have Permission to open the door. The PIN for the key must be entered at this time, even if it is the same key as was used to initiate the access-sequence.

After the user presents his key and enters his PIN, there will be an interval of time lasting Lock-Release-Duration (five seconds) during which it is possible to operate the door unlocking mechanisms. When opening an inner door, the Lock-Release-Signals are sent to both the (selected) inner door and the outer door at the same time. If the user fails to open the outer door during this interval, he must wait for a time of at least Lock-Release-Recovery (five seconds) before attempting another Lock-Release-Duration interval, which is again initiated by presenting the key.

In the absence of inner door sensors, if the user opens the outer door but fails to open the inner door, the lock will nevertheless assume that the inner door is also open. However, because the lock believes the inner door is open, there will be no delay (aside from some unlikely residue of the Lock-Release-Recovery) if the user logs-in and requests to open the inner door again.

In cases where the Delay-Interval is zero, the Lock-Release-Signal for the corresponding doors will be sent immediately upon the initial "open" request, and the countdown for the Access-Interval will also begin immediately. If the user should fail to open the outer door in the interval during which the Lock-Release-Signal is present, the lock returns to its idling-mode.

If there is no door sensor for an inner door, the lock can only assume that the door is open after it applies the Lock-Release-Signal and it will go into the access-internal. Also, in the case of no inner door state sensor, the interpretation of "closed" in the following must apply to the outer door, for it is only when the outer door is closed that the lock can know that each inner door is closed.

If the user does open the door and closes it before the Access-Interval expires, the transaction is normal, the door is in a locked state as soon as it is closed, and the lock returns to its idling-mode. On the other hand, if the door has not been closed when the Access-Interval expires, then special action is required. Loud beeps sound to remind the user. If the Open-Warning-Interval expires without the door having been closed, the Safe-Intrusion-Alarm-Signal is sent.

Besides Time-Lock-Override, there is another exception to the time lock constraint. If a door is already open and there is a sensor to tell the lock that this is so, then a user may request to unlock it at any time without delay. The purpose of this is to permit the user to withdraw the lock bolts in the unlikely event that the door gets into a state where the bolts are locked in the extended position and the door is still open.

REPORTS

History

All user interactions are logged in the locks internal RAM memory. The history buffer should hold at least 2,000 transactions. This history may be examined on the screen or dumped out through the serial port to a printer or into a file on a portable computer.

The logged data includes the Key-Index of the kay database corresponding to the key used to access the lock, the data and time of the access, the action performed, and any relevant parameters of the action. When such data is extracted, it is possible to qualify which events are actually reported based on time interval, Employee-ID or User-Name, and/or type of action. The Key-Index is not included in any report, but the associated EUI and User-Name (if available) are.

Database

The lock also produces reports on the internal state of its database. This includes the key-database and the settings of all settable internal parameters.

PERMISSIONS

Table 4 provides a list of Permissions used in the preferred embodiment, along with the bit-number for the Permissions-Defaults, Permissions Modifiability, and Active-Permission parameters.

TABLE 4

PERMISSIONS

| Bit No. | Permission |
|---|---|
| 0 | Unlock outer door |
| 1 | Unlock door 1 |
| 2 | Unlock door 2 |
| 3 | Unlock door 3 |
| 4 | Unlock door 4 |
| 5 | Unlock door 5 |
| 6 | Unlock door 6 |
| 9 | Print history |
| 10 | Display history |
| 11 | Print Database |
| 12 | Display Database |
| 13 | Adjust for Daylight Savings Time |
| 14 | Set access parameters for outer door |
| 15 | Set access parameters for inner doors |
| 16 | Set openable intervals for outer door |
| 17 | Set openable intervals for inner doors |
| 18 | Set openable intervals for control panels |
| 19 | Cancel openable intervals temporarily |
| 20 | Set time and date |
| 21 | Set Operating Parameters |
| 22 | Assign Exclusion Codes |
| 23 | Reinstate exclusion |
| 24 | Enter One-Time Combinations |
| 25 | External Override |
| 26 | Internal Override |
| 27 | Perform Pre-Enrollment |
| 28 | Set Location Code |
| 29 | Enroll Factory Key |
| 30 | Make Keys |
| 31 | Perform Factory Set-up |
| 33. | Enroll Keys |
| 34. | Delete Keys |
| 35. | Modify Permissions |

Although the present invention and its advantages have been described in detail, it should be understood tnat various changes, substitutions and alterations can be made herein without departing from the spirit and scope of the invention as defined by the appended claims.

What is claimed is:

1. An electronic lock system comprising:

a key having a first memory for storing a first parameter comprising a plurality of fields and a second parameter indicative of a number of said fields; and a lock comprising:

a receptacle for reading said first and second parameters from said first memory;

a second memory for storing a third parameter associated with the lock and comprising a plurality of fields;

compare circuitry for comparing respective fields of said first and third parameters, the number of fields compared based on said second parameter; and circuitry for providing access to said lock responsive to said compare circuitry, such that a single key may access a predetermined set of locks.

2. The electronic lock of claim 1 wherein said lock further comprises a database for storing information regarding keys provided access to the lock.

3. The electronic lock of claim 2 wherein said lock further comprises circuitry for setting said first parameter equal to said third parameter.

4. The electronic lock of claim 3 wherein said setting circuitry comprises circuitry for setting said first parameter to said third parameter if said first parameter is set to a predetermined value indicating that the key has not previously accessed another lock.

5. The electronic lock of claim 4 further comprising circuitry for returning said first parameter to said predetermined value.

6. A method of allowing access to a lock comprising:
reading first and second parameters from a memory presented to the lock, said first parameter comprising a plurality of fields and said second parameter indicating a predetermined number of said fields;
comparing a predetermined number of fields of said first parameter, based on said indicated predetermined number of said fields with corresponding fields of a third parameter associated with the lock; and
allowing access to the lock if said predetermined number of fields of said first parameter and corresponding fields of said third parameter match.

7. The method of claim 6 wherein said first parameter comprises a plurality of binary coded digits.

8. The method of claim 7 wherein each field of said first parameter comprises a binary coded digit.

9. The method of claim 6 further comprising the step of writing the value of said third parameter to said first parameter, if said first parameter is equal to a predetermined value.

* * * * *

UNITED STATES PATENT AND TRADEMARK OFFICE

CERTIFICATE OF CORRECTION 5,349,345

PATENT NO. : September 20, 1994

DATED : David J. Vanderschel

INVENTOR(S) :

It is certified that error appears in the above-indentified patent and that said Letters Patent is hereby corrected as shown below:

Col. 3, ln. 55, after "in" ", insert --,--.

Col. 6, ln. 50, after "yes"", insert --,--.

Col. 6, ln. 56, after "1"", insert --,--.

Col. 11, ln. 53, after "lock" ", insert --,--.

Col. 11, ln. 53, after "locks"", insert --,--.

Col 13, ln. 59, after "Combination" ", insert --,--.

Col. 15, ln. 55, delete "kay", insert --key--.

Col 16, Table 4, insert space between lines "6" and "9".
insert space between lines "12" and "13".
insert space between lines "13" and "14".
insert space between lines "19" and "20".
insert space between lines "20" and "21".

UNITED STATES PATENT AND TRADEMARK OFFICE

CERTIFICATE OF CORRECTION

PATENT NO. : 5,349,345

DATED : September 20, 1994

INVENTOR(S) : David J. Vanderschel

It is certified that error appears in the above-indentified patent and that said Letters Patent is hereby corrected as shown below:

Col. 16, Table 4, insert space between lines "20" and "21".

Signed and Sealed this

Twenty-eighth Day of November 1995

*Attest:*

BRUCE LEHMAN

*Attesting Officer*

*Commissioner of Patents and Trademarks*